US006505494B1

(12) United States Patent
Wollermann

(10) Patent No.: US 6,505,494 B1
(45) Date of Patent: Jan. 14, 2003

(54) METHOD OF CALIBRATING A CRIMPING PRESS

(75) Inventor: Kenneth A. Wollermann, Mukwonago, WI (US)

(73) Assignee: Artos Engineering Company, Waukesha, WI (US)

( * ) Notice: Subject to any disclaimer, the term of this patent is extended or adjusted under 35 U.S.C. 154(b) by 0 days.

(21) Appl. No.: 09/397,937

(22) Filed: Sep. 17, 1999

(51) Int. Cl.[7] .......................... G01L 25/00; B21C 51/00
(52) U.S. Cl. .................. 73/1.15; 72/31.1; 702/104; 702/105
(58) Field of Search ................. 73/1.15; 72/31.1, 72/10.1, 20.1, 20.2, 21.1, 21.4, 21.5; 702/104, 105; 29/705, 753, 863, 593, 715

(56) References Cited

U.S. PATENT DOCUMENTS

| 3,184,950 | A | * | 5/1965 | Sitz ........................... 29/753 X |
| 5,197,186 | A | * | 3/1993 | Strong et al. ................. 29/863 |
| 5,271,254 | A | | 12/1993 | Gloe et al. ..................... 72/19 |
| 5,845,528 | A | | 12/1998 | Wollermann ................. 72/451 |
| 6,212,924 | B1 | * | 4/2001 | Meisser ....................... 72/264 |

FOREIGN PATENT DOCUMENTS

| DE | 3737924 A1 | * | 5/1989 | ............ G01L/5/00 |
| FR | 2608760 | * | 6/1988 | ................ 72/10.1 |
| FR | 2656096 | * | 6/1991 | ........... G01L/25/00 |
| JP | 52-16277 | * | 2/1977 | ................ 73/1.15 |

* cited by examiner

*Primary Examiner*—Thomas P. Noland
(74) *Attorney, Agent, or Firm*—Andrus, Sceales, Starke & Sawall, LLP

(57) ABSTRACT

A method for calibrating a crimping press for crimping terminals on an electrical conductor. A master tool is positioned in a test crimping press and the press is operated to crimp a test bar to a desired crimp height. During the process of crimping the test bar to the desired crimp height, a standard force profile is generated. The standard force profile is recorded in a control unit. The master tool is transferred to a crimping press to be calibrated. Once the master tool is in place, the crimping press is operated until the crimping press creates a crimp height on the test bar equal to the desired crimp height. During the crimping process that results in the desired crimp height, an actual force profile is determined for the crimping press being calibrated. The actual force profile is compared to the standard force profile and the actual force profile is adjusted by an offset factor such that the adjusted force profile replicates the standard force profile. The calculated offset factor is then used to standardize the output of the load sensor such that an ideal force profile can be used during operation of the crimping press to perform crimp quality monitoring without additional calibration.

10 Claims, 4 Drawing Sheets

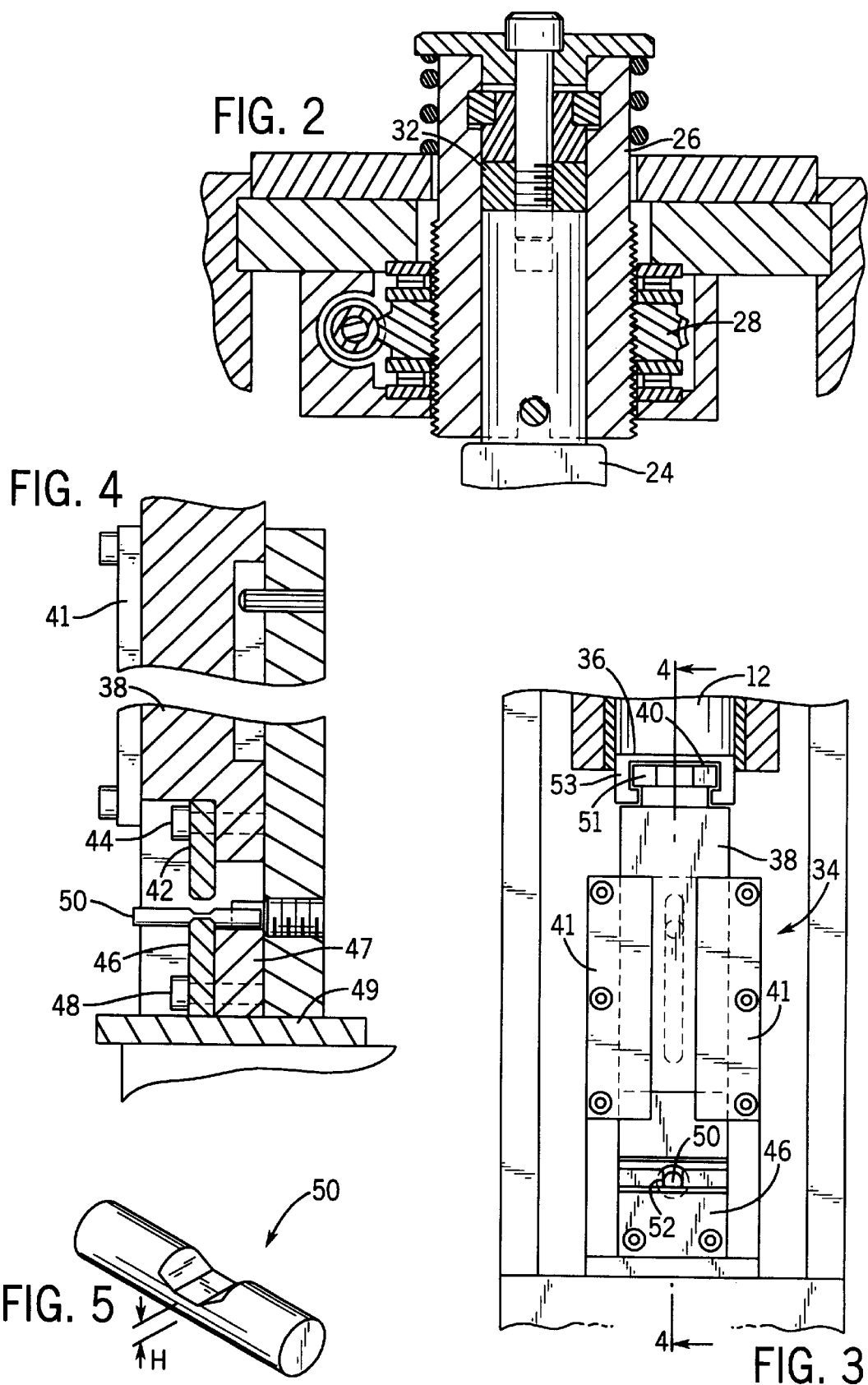

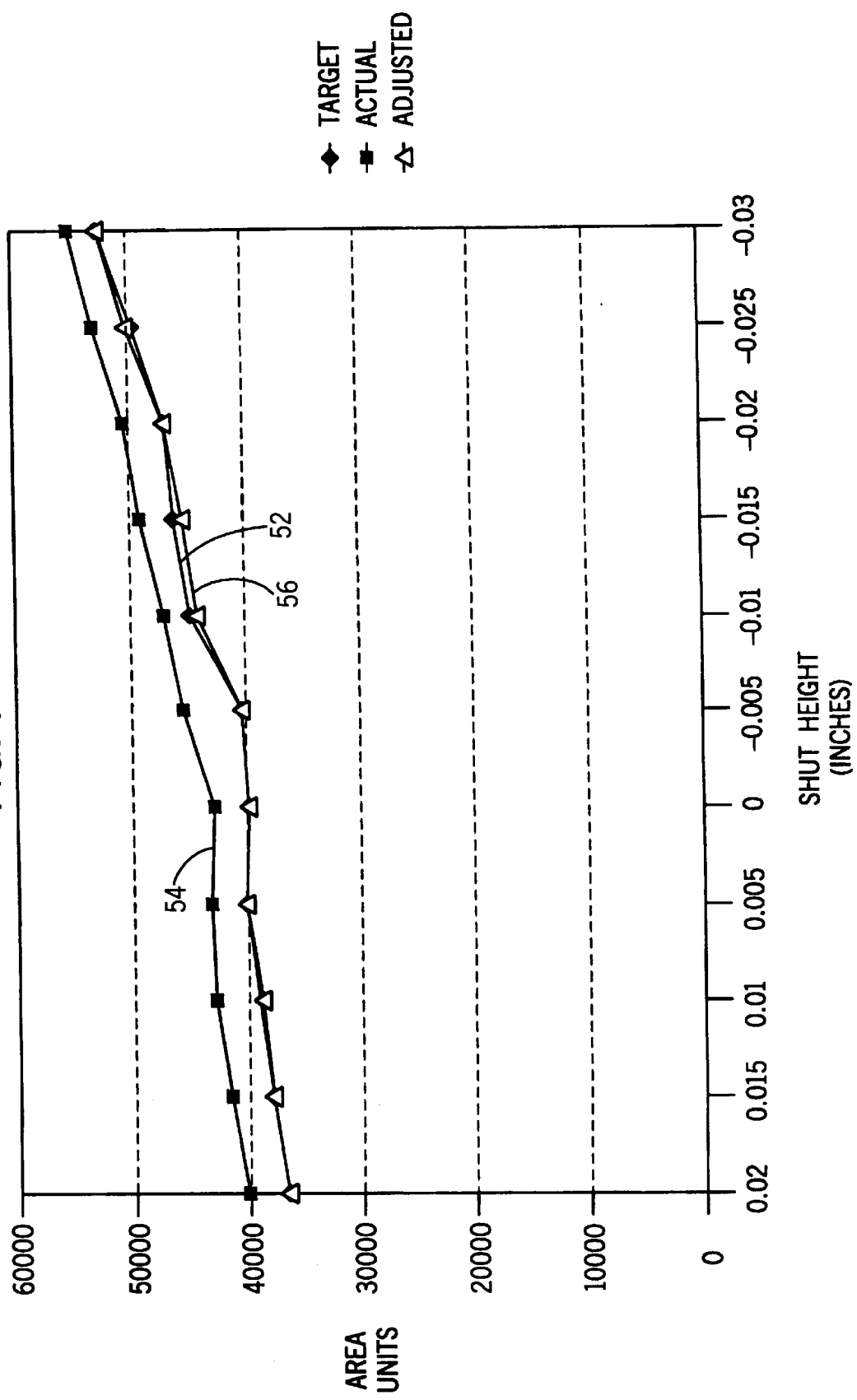

METHOD OF CALIBRATING A CRIMPING PRESS

BACKGROUND OF THE INVENTION

The present invention generally relates to a method and apparatus for applying terminals to the ends of wire and inspecting the quality of the termination automatically at or during the time of the termination application. More specifically, the present invention relates to a method of calibrating a crimping press such that during the application of a terminal to the end of a wire, the measured force profile curve can be compared to a predetermined ideal force profile curve for an acceptable termination.

In the art of wire processing, and more specifically in the process of applying terminals to the ends of wire, it is important that the process does not allow any undetected bad terminations between the applied terminal and the bare wire. The process of applying terminals and inspecting the quality of the termination automatically at or during the time of the terminal application is a desired feature that has been performed in many ways in prior art systems.

In the prior art systems, there are several methods of crimp quality monitoring (CQM). These methods range from the manual visual inspection of the termination by the operator and manual measurements of the termination height (crimp height), width, and pull force to the automated monitoring of the crimping forces and actual crimp height during the crimping process. The higher end and more sophisticated methods for CQM utilize a sensor in the crimping press unit/applicator to measure the force or strain exerted during the process. Typically, the sensor is a piezoelectric load sensor.

After completion of the crimping operation, the output of the piezoelectric load sensor is analyzed and compared to known profiles representing a satisfactory terminal application. As an example, U.S. Pat. No. 5,271,254, incorporated herein by reference, illustrates a CQM method in which the load sensor and an encoder are used to produce an actual crimping force envelope that includes a peak force value and the total work of the crimping press. The actual crimping force envelope is compared to an ideal envelope and a failure signal is generated if the actual envelope varies from the ideal.

Typically, the ideal force profile of an acceptable termination is learned into the CQM system at the beginning of the termination process by repeatedly compiling the force data over several cycles in which an acceptable termination is created. Once the ideal force profile has been determined, a control unit monitors for variations in the actual, measured profile as compared to the known ideal profile as terminals are applied to the ends of wire. If a significant variation is detected, the bad termination is discharged. If several consecutive bad terminations are detected, operation of the crimping press unit may be suspended until the problem has been identified.

Although this method of CQM is effective in identifying a bad termination, a drawback exists in that each time a new crimp height or a different type of wire or terminal is applied, the crimping press must go through a learning process to determine the ideal profile of an acceptable termination. In facilities that use a crimping press to run many small batches of wire terminations each utilizing different size wires and terminals, the process of learning the ideal profile for an acceptable termination creates a substantial hindrance.

Therefore, it is an object of the present invention to provide a method of calibrating a crimping press, such that after calibration, the force measurements taken during operation can be compared to a previously determined ideal profile curve and defects detected. It is an additional object of the present invention to provide a master tool and a common test bar to calibrate each individual crimping press. Further, it is an object of the present invention to provide a method that standardizes the piezoelectric load sensor contained in separate individual crimping presses such that the load sensor generates an output nearly identical to the output of similar load sensors in separate crimping presses.

SUMMARY OF THE INVENTION

The present invention is directed to a method and an apparatus for calibrating a crimping press such that during the application of a terminal to the end of a wire, the measured force profile curve can be compared to a predetermined standard force profile curve for a satisfactory termination.

Initially, a master tool is positioned in a test crimping press. The master tool includes a stationary anvil and a movable die member. The die member is mounted to a movable body of the master tool, which in turn is coupled to the movable ram contained in the test crimping press. As the crimping press moves the ram between its open and closed positions, the die member of the master tool moves toward and away from the stationary anvil.

A test bar having a standardized shape and composition is positioned in the master tool between the anvil and the die member. As the test crimping press moves to the closed position, the die member of the master tool crimps the test bar positioned in the master tool. After the test bar has been crimped, the crimp height of the test bar is measured and compared to a desired crimp height. If the measured crimp height does not equal the desired crimp height, the shut height of the test crimping press is adjusted and the crimping steps repeated until the measured crimp height equals the desired crimp height.

Once the measured crimp height equals the desired crimp height, the control unit for the test crimping press records the forces measured during operation of the test crimping press as a standard force profile curve. The standard force profile is recorded from a test load sensor positioned in the test crimping press that measures the amount of force applied by the test crimping press during the crimping of the test bar. The standard force profile determined by the test crimping press is recorded in the control unit such that the standard force profile can be used during the calibration of additional crimping presses.

After the standard force profile has been determined, the master tool is transferred to a crimping press that is being calibrated. Once the master tool has been installed in the crimping press, the control unit of the crimping press is set to its default, or "zero" shut height and the crimping press is operated to crimp the test bar between the die member and anvil of the master tool. The crimp height of the test bar is measured and the shut height of the crimping press being calibrated is repeatedly adjusted until the measured crimp height equals the desired crimp height.

During the repeated adjustments in the shut height of the crimping press to create the desired crimp height, the shut height of the crimping press is adjusted from its default or "zero" position by a shut height adjustment factor. Once the desired crimp height has been formed, the zero position of the crimping press is offset by the adjustment factor such that when the crimping press is subsequently set at the zero position, the crimping press being calibrated will produce the desired crimp height.

Once the shut height adjustment factor has been determined for the crimping press being calibrated, an actual force profile is recorded in the control unit of the crimping press being calibrated. The actual force profile is determined by measurements taken from a load sensor contained in the crimping press.

The actual force profile measured during the crimping of the test bar to the desired crimp height is compared to the standard force profile previously determined in the test crimping press. If the actual force profile varies from the test force profile, an offset factor is determined that, when applied to the actual force profile, adjusts the actual force profile such that the actual force profile replicates the standard force profile.

Once the offset factor and the shut height adjustment factor have been determined, the master tool is removed from the crimping press and the crimping press can be used to apply terminals to the ends of wire. The offset factor is utilized in combination with the output of the load sensor such that the output of the load sensor is standardized, while the shut height adjustment factor normalizes the zero position for each crimping press. Thus, ideal force profiles and ideal shut height adjustments from the zero position for the various terminal application processes can be input into the control unit of the crimping press and the output of the load sensor compared to the ideal force profile to determine whether a suitable terminal application has been performed. In this manner, a set of ideal force profiles can be input into the control unit without the requirement of the crimping press learning the ideal force profile for each variation in the process being performed.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a section view taken along line 2—2 of FIG. 1 illustrating the positioning of a load device in the crimping press;

FIG. 3 is a front view taken along line 3—3 of FIG. 1 illustrating the master tool as positioned in the crimping press;

FIG. 4 is a section view taken along line 4—4 of FIG. 3 illustrating a die member and anvil of the master tool;

FIG. 5 is a perspective view of a portion of the test bar having been crimped by the operation of the master tool;

FIG. 7 is a graph illustrating the total work exerted by the crimping press for various crimp heights.

DETAILED DESCRIPTION OF THE INVENTION

Figure 1:
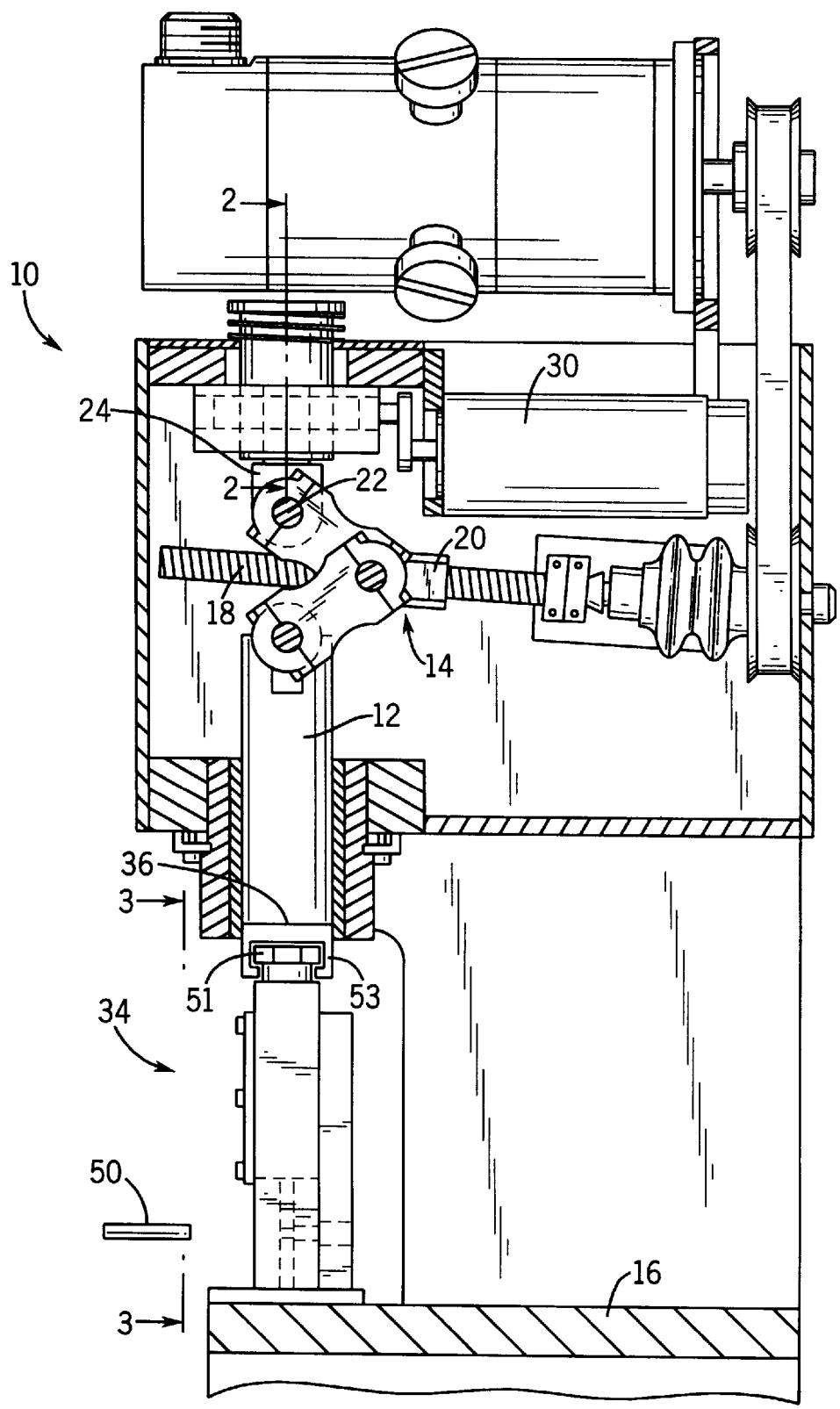
FIG. 1 is a partial section view of a crimping press including a master tool for crimping a test bar to calibrate the crimping press.

Referring first to FIG. 1, thereshown is a standard crimping press 10 for crimping an electrical terminal to the exposed end of an electrical conductor. The crimping press 10 shown in FIG. 1 is a standard device, the details of which are shown and described in U.S. Pat. No. 5,845,528, the subject matter of which is incorporated herein by reference.

In general, the crimping press 10 includes a ram 12 that is mounted to a toggle mechanism 14 for reciprocating movement both toward and away from a base plate 16. The movement of the ram 12 toward and away from the base plate 16 is controlled by the rotational operation of a drive screw 18 that, when rotated, moves a ball nut 20 along the length of the drive screw 18. Movement of the ball nut 20 along the drive screw 18 will move the toggle mechanism 14 to an on-center or closed position, thereby causing the ram 12 to move toward the base plate 16. Further rotation of the drive screw 18 will move the toggle mechanism 14 to the over-center or release position, as shown in FIG. 1, at which time the ram 12 is moved away from the base plate 16. Continued forward and reverse rotation of the drive screw 18 allows the ram 12 to be repeatedly moved between its closed and released positions to crimp terminals on wires in the manner described in U.S. Pat. No. 5,845,528.

The shut height of the crimping press 10 can be conveniently varied by adjusting the vertical position of the pivot 22. The pivot 22 is connected to an anchor link 24, the position of which can be adjusted by rotational movement of a sleeve 26 relative to a movable gear 28, as shown in FIG. 2. When the gear 28 is rotated by a drive motor 30, shown in FIG. 1, the threaded connection between the gear 28 and the sleeve 26 move both the sleeve 26 and the anchor pin 24 vertically to adjust the shut height of the ram 12.

Referring again to FIG. 2, a load sensor 32 is positioned to sense the load or force exerted by the crimping press 10 during the crimping action. The load sensors 32 is preferably a piezoelectric sensor that generates a voltage based upon the amount of force sensed during the crimping process. Although the preferred embodiment of the invention is shown in which the load sensor 32 is positioned on an opposite side of the toggle mechanism 14 from the ram 12, it is contemplated that the load sensor 32 could be positioned in any location as long as the load sensor 32 can detect the amount of force being exerted by the ram 12 during the crimping process.

Referring now to FIGS. 1 and 3, the crimping press 10 is shown as including a master tool 34. The master tool 34 is removably positioned beneath the bottom end 36 of the ram 12. The master tool 34 includes a movable body 38 having an upper end 40 attached to the bottom end 36 of the ram 12. A pair of guide plates 41 guide the vertical movement of the body 38 and prevent the outward movement of the body 38, as best seen in FIG. 4.

A die member 42 is secured to the body 38 by a pair of connectors 44, as shown in FIG. 4. The die member 42 is spaced above an anvil 46 that is secured to a spacing and guide block 47 by a pair of connectors 48. The spacing and guide block 47, in turn, is attached to a connecting plate 49. The connecting plate 49 rests upon the base plate 16 of the crimping press 10.

As previously discussed, rotation of the drive screw 18 will move the toggle mechanism 14 to the on-center of closed position, thereby moving the ram 12 downward. Downward movement of the ram 12 will affect a corresponding downward movement of the body 38, and associated die member 42, toward the anvil 46. When the toggle mechanism 14 is at the on-center or closed position, the distance between the die member 42 and the anvil 46 is referred to as the shut height for the crimping press 10.

In the preferred embodiment of the invention, the upper end 40 of the master tool 34 includes an attachment knob 51 that is securely held in contact with the ram 12 of the crimping press 10. Specifically, an adapter 53 is attached to the bottom end 36 of the ram 12 and receives the attachment knob 51 as best shown in FIGS. 1 and 3.

Referring now to FIGS. 3 and 4, the spacing and guide block 47 includes a notch 52 sized to receive a test bar 50 that is to be crimped by operation of the master tool 34. The notch 52 provides for proper alignment of the test bar 50 between the movable die member 42 and the anvil 46 such that the position of the crimp formed in the test bar 50 by operation of the master tool 34 is consistent.

The method of utilizing the master tool 34 to calibrate crimping presses 10 having various constructions will now be discussed. Initially, the master tool 34 is installed in a test crimping press that will be utilized to generate a set of standard force curves that will be utilized to calibrate various other crimping presses. Once the master tool 34 has been installed into the test crimping press, as shown in FIG. 1, the test bar 50 is positioned in the notch 52 between the die member 42 and anvil 46 of the master tool 34.

The test bar 50 is a bar of material having a selected diameter and a specifically known composition. While the specific composition and shape of the test bar 50 is not critical, it is important that a test bar 50 having an identical size and composition be used during the entire calibration process to be discussed. The consistent properties of the test bar 50 throughout the calibration process is critical in the calibration process of the invention. In the preferred embodiment of the invention shown, the test bar 50 is formed from copper and has a circular cross-section as shown in FIG. 5.

After the test bar 50 has been positioned between the die member 42 and the anvil 46, the shut height of the test crimping press is set at the default or "zero" position and the press is operated to move the die member 42 toward the anvil 46 to crimp the test bar 50. After the test bar 50 has been crimped, it is removed from the master tool and the crimp height, as illustrated by reference character H in FIG. 5, is measured by a micrometer. The measured crimp height is compared to a preselected, desired crimp height. In the preferred embodiment of the invention, the desired crimp height selected at 0.065 inches, although the exact value of the desired crimp height is not critical. However, maintaining the same desired crimp height throughout the entire calibration process is an additional critical feature of the present invention as will be discussed in detail below.

If the measured crimp height H does not equal the preselected, desired crimp height, the shut height for the crimping press 10 is adjusted in the manner previously discussed. In the crimping press 10 shown in FIG. 1, the shut height is adjusted by operating the drive motor 30 to move the sleeve 26 and thus the pivot 22.

With the shut height adjusted, the test crimping press is again operated to crimp a new portion of the test bar 50 between the die member 42 and the anvil 46. After the test bar 50 has been crimped, the crimp height H is again measured. This process is repeated until the measured crimp height H equals the desired crimp height.

After the desired crimp height has been created in the test bar 50, the amount of adjustment in the shut height from the zero position is recorded as a shut height adjustment factor. The shut height of the test crimping press is then offset by the adjustment factor such that when the test crimping press is set to the adjusted zero position, the test crimping press will produce the desired crimp height.

Once the shut height adjustment factor has been determined and measured crimp height H equals the desired crimp height, the computerized control unit for the test crimping press (not shown) records a detailed force profile for the amount of force exerted by the ram 12 during the crimping process. Specifically, the computer control unit receives detailed information from the load sensor 32 relative to the operational position of the ram 12 during its operational sequence. The operational position of the ram 12 is determined by an encoder coupled to the drive screw 18. The computer control unit stores the information from the load sensor 32 and determines the peak force and force area during the crimping process.

The detailed force profiles generated during the crimping process is recorded as a set of standard force profiles. The standard force profiles can be determined either during the crimping step that resulted in the desired crimp height, or the test crimping press can be operated over several cycles, each of which generate the desired crimp height, to determine the standard force profiles.

Figure 6:
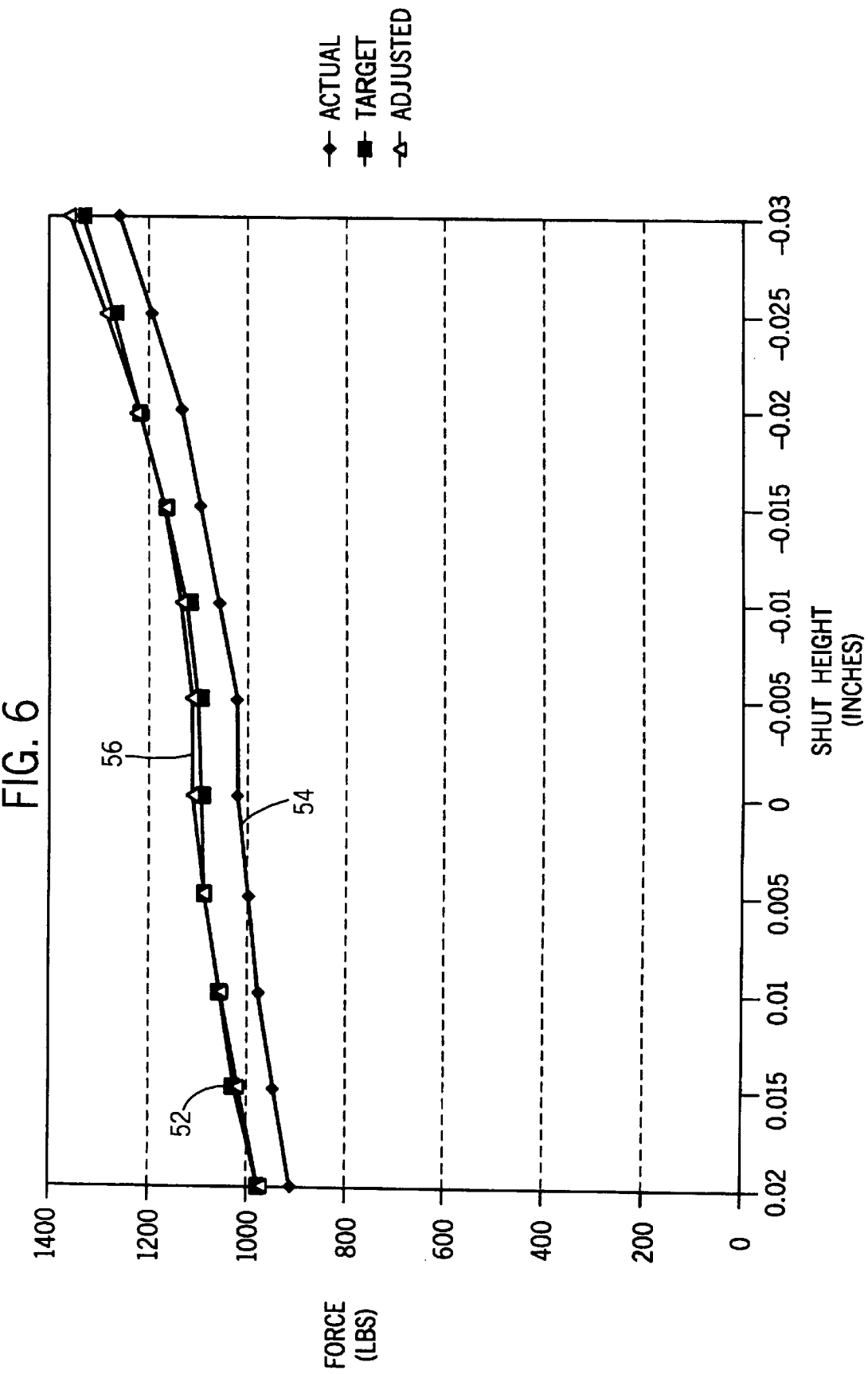
FIG. 6 is a graph illustrating the peak force exerted by the crimping press for various crimp heights.

Referring now to FIGS. 6 and 7, the standard force profiles determined by operation of the test crimping press in the manner previously discussed are shown and referred to by reference numeral 52. Specifically, FIG. 6 illustrates the standard force profile relating the peak force to the crimp height, while FIG. 7 illustrates the standard force profile 52 relating the force area to the crimp height.

After the standard force profiles have been generated by the test crimping press, the master tool 34 is removed from the test crimping press and installed in a crimping press that has yet to be calibrated. The crimping press to be calibrated can be the same type of press as the test crimping press, or can be a crimping press having a different overall configuration.

Once the master tool 34 has been installed in the crimping press to be calibrated, a portion of the test bar 50 is positioned in the notch 52 between the die member 42 and the anvil 46. Once the test bar 50 has been correctly positioned, the shut height for the crimping press to be calibrated is set to the default or zero position and the press is operated to crimp the test bar 50.

After the test bar 50 has been crimped, the test bar 50 is removed and the crimp height H is measured by a micrometer. If the measured crimp height H does not equal the desired crimp height, the shut height of the crimping press is adjusted from the zero position. As previously discussed, both the test bar 50 and the desired crimp height are identical to those utilized in generating the standard force profiles during operation of the test crimping press. Maintaining the test bar 50 and the desired crimp height at identical values is critical in the calibration process of the present invention.

The shut height of the crimping press 10 being calibrated is continuously adjusted until the crimping press 10 creates a measured crimp height H on the test bar 50 that is equal to the desired crimp height. After the desired crimp height has been created in the test bar 50, the amount of adjustment in the shut height from the zero position is recorded as a shut height adjustment factor. The zero position for the crimping press being calibrated is then offset by the determined adjustment factor such that when the crimping press being calibrated is set to the zero position, the crimping press will product the desired crimp height and thus be normalized.

Once the shut height adjustment factor for the crimping press being calibrated has been determined and the desired crimp height on the test bar 50 has been created, the computerized control unit (not shown) of the crimping press 10 being calibrated records a detailed set of actual force profiles from the load sensor 32 for the crimping press 10. The detailed set of actual force profiles can be recorded either during the crimping operation that generated the first desired crimp height, or the crimping press can be operated for several successive cycles and the actual force profiles determined by a compilation of several processing steps.

Referring now to FIGS. 6 and 7, the actual force profiles measured during the crimping of the test bar 50 to the desired crimp height are shown and referred to by reference numeral 54. Specifically, the actual force profile 54 relating the peak force to the crimp height is shown in FIG. 6, while the actual force profile 54 relating the force area to the crimp height is shown in FIG. 7.

After the actual force profiles 54 for the crimping press 10 being calibrated are determined, the actual force profiles 54 are compared to the standard force profiles 52 previously calculated. Referring now to FIG. 6, thereshown is a comparison between the actual force profile 54 and the standard force profile 52, each relating the peak force to the crimp height and generated in accordance with the process previously discussed. As can be seen by comparing the standard force profile 52 to the actual force profile 54, the two force profiles vary. The differences between the two force profiles shown in FIG. 4 result from the different operation characteristics of the load sensors 32 and the differences in the physical dynamics of the two different crimping presses utilized. The differences in the operating characteristics of each load sensor 32 and the individual dynamics of the presses previously made the utilization of a standard ideal force profile for numerous crimping presses impossible, since each individual load sensor may generate a different output for the same value of the actual force being measured. Therefore, in order for a single set of standard force profiles to be utilized over separate, individual crimping presses, the operating characteristics of the load sensor 32 for each press and the physical press dynamics must be standardized.

As can be understood in the graphs of FIGS. 6 and 7, the actual force profile 54 can be simply offset from the ideal force profile 52 by a constant value such that the constant value can be added to or subtracted from the actual force profile 54 to make the actual force profile 54 equal to the standard force profile 52. However, it is also likely that the actual force profile 54 is not only be shifted from the standard force profile 54, but also has a different overall slope due to nonlinear variations between the two individual load sensors 32. Therefore, to adjust the actual force profile 54 to replicate the standard force profile 54, an offset factor is generated that may both shift the actual force profile 54 along the vertical axis shown in FIGS. 6 and 7, and at the same time adjust the slope of the actual force profile 54 by a multiplier.

An adjusted force profile 56 is shown in both FIGS. 6 and 7. The adjusted force profile 56 in each of the Figures illustrates the effect the offset factor has on the actual force profile 54 to bring the actual force profile 54 in line with the standard force profile 52.

Once the offset factor has been determined, the offset factor is stored in the computerized control unit for the calibrated crimping press 10 and is utilized to adjust all of the force values generated by the load sensor 32.

After the crimping press 10 has been calibrated in the manner discussed above, standardized ideal load profiles can be input into the computerized control unit of the crimping press for numerous types of crimping operations and during use of the crimping press with wires having various diameters. Based upon these stored ideal operating profile, the control unit for the crimping press 10 can perform crimp quality monitoring (CQM) in a conventional manner, such as shown in U.S. Pat. No. 5,271,254. In the past, when different types of terminals or wire diameters were utilized in the crimping press 10, the crimping press 10 had to run through a separate calibration process each time the operating characteristics were changed. During the calibration process, numerous terminals were applied and a standard set of curves generated for good terminal connections. By utilizing the calibration process of the present invention, including the test bar and master tool of the present invention, each individual crimping press is calibrated and standard, predetermined ideal force profiles can be utilized for multiple machines, since the output of the load sensor 32 for each machine is standardized.

Although the present invention has been discussed as including the master tool 34 and the test bar 50 to calibrate each of the crimping presses, it is contemplated by the inventor that the master tool 34 and test bar 50 could be replaced by a standard crimping die, a standard terminal and a standard wire. To calibrate the crimping presses using these alternate components, the standard crimping die is moved from one crimping press to the next and the same type of terminal is crimped on the standard wire. Although this alternate embodiment would allow each of the crimping presses to be calibrated in the manner discussed above, the preferred embodiment of the invention utilizing the master tool and test bar is contemplated as being a more effective and easier to use system.

Various alternatives and embodiments are contemplated as being within the scope of the following claims particularly pointing out and distinctly claiming the subject matter regarded as the invention.

I claim:

1. A method of calibrating a crimping press for crimping an electrical terminal on a wire, the crimping press including a load sensor that measures the forces exerted by the crimping press during the crimping process, the method comprising the steps of:

positioning a master tool in a test crimping press, the master tool including an anvil and a die member;

positioning a test bar in the master tool;

operating the test crimping press to move the die member of the master tool toward the anvil to crimp the test bar to a desired crimp height;

recording a standard force profile measured by a test load sensor in the test crimping press during the crimping of the test bar to the desired crimp height;

transferring the master tool to the crimping press being calibrated;

positioning an uncrimped portion of the test bar in the master tool;

operating the crimping press being calibrated to move the die member of the master tool toward the anvil to crimp the test bar to the desired crimp height;

recording an actual force profile measured by the force sensor of the crimping press being calibrated during the crimping of the test bar to the desired crimp height;

comparing the actual force profile to the standard force profile; and adjusting the actual force profile to approximately replicate the standard force profile such that the adjusted output of the load sensor will approximately equal the output of the test load sensor.

2. The method of claim 1 wherein the test bar has a known uncrimped diameter and is of a known hardness.

3. The method of claim 1 wherein the step of operating the crimping press being calibrated to crimp the test piece to the desired crimp height includes the steps of:

a) operating the crimping press to crimp the test bar;

b) removing the test bar from the master tool and measuring the crimp height;

c) comparing the measured crimp height to the desired crimp height;

d) adjusting a shut height of the crimping press when the measured crimp height varies from the desired crimp height; and e) repeating steps a)–d) until the measured crimp height equals the desired crimp height.

4. The method of claim 1 further comprising the step of transferring the standard force profile to a control unit associated with the crimping press being calibrated such that the control unit compares the standard force profile to the actual force profile.

5. The method of claim 1 wherein the step of adjusting the actual force profile to replicate the standard force profile includes the step of determining an offset factor that is applied to the load sensor such that the output of the load sensor approximately equals the output of the test load sensor.

6. A method of calibrating a crimping press for crimping an electrical terminal on a wire, the method comprising the steps of:

positioning a master tool in a test crimping press, the master tool including an anvil and a die member;

positioning a test bar in the master tool;

operating the test crimping press to move the die member of the master tool toward the anvil to crimp the test bar to a desired crimp height;

recording a standard force profile measured by a test load sensor during the crimping of the test bar to the desired crimp height;

transferring the master tool to the crimping press being calibrated;

positioning an uncrimped portion of the test bar in the master tool;

operating the crimping press being calibrated to move the die member of the master tool toward the anvil to crimp the test bar;

measuring the crimp height of the test bar and comparing the measured crimp height to the desired crimp height;

adjusting the crimping press and repeatedly operating the crimping press until the measured crimp height equals the desired crimp height;

recording an actual force profile measured by the force sensor of the crimping press during the crimping of the test piece to the desired crimp height;

comparing the actual force profile to the standard force profile;

adjusting the actual force profile to approximately replicate the standard force profile such that the adjusted output of the load sensor will replicate the output of the test load sensor; and adjusting the actual shut height required to produce the desired crimp height to equal a standard shut height determined by the test crimping press.

7. The method of claim 6 wherein the step of adjusting the actual force profile to replicate the standard force profile includes generating an offset factor.

8. The method of claim 6 wherein the step of adjusting the crimping press includes the steps of:

adjusting the shut height of the crimping press by a shut height adjustment factor; and applying the shut height adjustment factor to a default setting for the crimping press to create an adjusted default setting that creates the desired crimp height.

9. The method of claim 6 wherein the standard force profile is recorded in a control unit of the test crimping press and the standard force profile is transferred to a control unit of the crimping press being calibrated for comparison to the actual force profile.

10. The method of claim 6 wherein the test load sensor and the load sensor of the crimping press being calibrated are piezoelectric force sensors.

* * * * *